(12) United States Patent
Bae et al.

(10) Patent No.: US 10,995,208 B2
(45) Date of Patent: May 4, 2021

(54) THERMOPLASTIC RESIN COMPOSITION, METHOD FOR PRODUCING SAME, AND MOLDED PRODUCT FORMED THEREFROM

(71) Applicant: LOTTE ADVANCED MATERIALS CO., LTD., Yeosu-si (KR)

(72) Inventors: Yun Seok Bae, Uiwang-si (KR); Kyun Ha Ban, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 193 days.

(21) Appl. No.: 16/345,798

(22) PCT Filed: Oct. 30, 2017

(86) PCT No.: PCT/KR2017/012047
§ 371 (c)(1),
(2) Date: Apr. 29, 2019

(87) PCT Pub. No.: WO2018/080250
PCT Pub. Date: May 3, 2018

(65) Prior Publication Data
US 2019/0248994 A1    Aug. 15, 2019

(30) Foreign Application Priority Data

Oct. 31, 2016 (KR) .................. 10-2016-0143623

(51) Int. Cl.
| | | |
|---|---|---|
| *C08L 25/14* | (2006.01) | |
| *C08F 212/08* | (2006.01) | |
| *C08K 7/06* | (2006.01) | |
| *C08K 5/101* | (2006.01) | |
| *C08K 13/02* | (2006.01) | |
| *C08J 3/20* | (2006.01) | |
| *C08K 3/04* | (2006.01) | |
| *C08F 222/10* | (2006.01) | |
| *C08K 3/00* | (2018.01) | |
| *C08K 7/02* | (2006.01) | |
| *C08F 222/06* | (2006.01) | |
| *C08L 25/08* | (2006.01) | |
| *C08L 53/02* | (2006.01) | |
| *C08K 7/14* | (2006.01) | |
| *C08L 25/12* | (2006.01) | |

(52) U.S. Cl.
CPC ............ *C08L 25/14* (2013.01); *C08F 212/08* (2013.01); *C08F 222/06* (2013.01); *C08F 222/10* (2013.01); *C08J 3/203* (2013.01); *C08K 3/00* (2013.01); *C08K 3/04* (2013.01); *C08K 5/101* (2013.01); *C08K 7/02* (2013.01); *C08K 7/06* (2013.01); *C08K 7/14* (2013.01); *C08K 13/02* (2013.01); *C08L 25/08* (2013.01); *C08L 25/12* (2013.01); *C08L 53/02* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 3,428,588 A | * | 2/1969 | Fertig .................. C08F 222/06 525/303 |
| 7,422,258 B2 | | 9/2008 | Schindler et al. |
| 2010/0022662 A1 | | 1/2010 | Gobelt et al. |

FOREIGN PATENT DOCUMENTS

| | | |
|---|---|---|
| DE | 147730 A1 | 4/1981 |
| HU | 205159 B | 3/1992 |
| JP | 64-020218 A | 1/1989 |
| JP | 05-065398 A | 3/1993 |
| JP | H07-175216 | 7/1995 |
| KR | 10-2007-0046914 A | 5/2007 |
| KR | 10-2012-0021631 A | 3/2012 |
| WO | 2010/115564 A1 | 10/2010 |
| WO | 2018/080250 A1 | 5/2018 |

OTHER PUBLICATIONS

International Search Report in counterpart International Application No. PCT/KR20171012047 dated Feb. 2, 2018, pp. 1-4.
Search Report in counterpart European Application No. 17865122.0 dated May 19, 2020, pp. 1-7.

* cited by examiner

*Primary Examiner* — Robert T Butcher
(74) *Attorney, Agent, or Firm* — Additon, Pendleton & Witherspoon, P.A.

(57) ABSTRACT

A thermoplastic resin composition of the present invention comprises: approximately 100 parts by weight of a thermoplastic resin including a repeat unit represented by Chemical Formula 1, a repeat unit represented by Chemical Formula 2, and a repeat unit represented by Chemical Formula 3; and approximately 5 to 40 parts by weight of a reinforcing filler. The thermoplastic resin composition is excellent in terms of heat resistance, stiffness, lightweight properties, and external appearance, and exhibits excellent balance between said physical properties.

13 Claims, 1 Drawing Sheet

[FIG. 1]
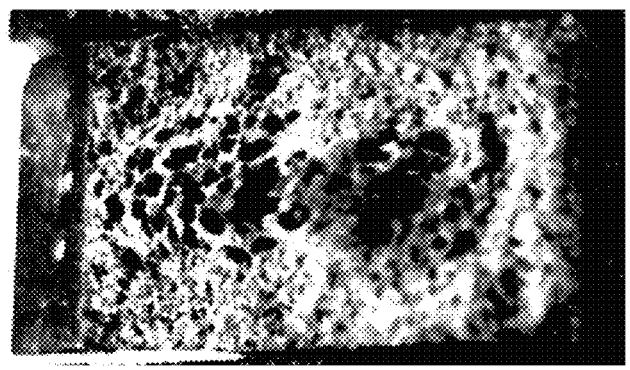
[FIG. 2]
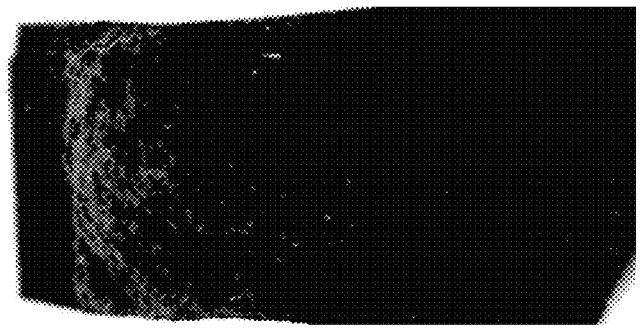

THERMOPLASTIC RESIN COMPOSITION, METHOD FOR PRODUCING SAME, AND MOLDED PRODUCT FORMED THEREFROM

CROSS-REFERENCE TO RELATED APPLICATIONS

This application claims priority to and the benefit of International Application No. PCT/KR2017/012047, filed Oct. 30, 2017, which published as WO 2018/080250 on May 3, 2018; and Korean Patent Application No. 10-2016-0143623 filed in the Korean Intellectual Property Office on Oct. 31, 2016, the entire disclosure of each of which is incorporated herein by reference.

TECHNICAL FIELD

The present invention relates to a thermoplastic resin composition, a method for preparing the same, and a molded product formed therefrom. More particularly, the present invention relates to a thermoplastic resin composition having good properties in terms of rigidity, heat resistance, lightness, external appearance, and the like, a method for preparing the same, and a molded product formed therefrom.

BACKGROUND ART

A thermoplastic resin composition including acrylonitrile-butadiene-styrene (ABS) has good properties in terms of impact resistance, moldability, external appearance, and the like, and is broadly used in various fields including automobile components, electric/electronic products, office equipment, and the like.

In particular, although a thermoplastic resin composition for automobiles includes reinforcing fillers such as glass fibers to improve mechanical properties such as rigidity and heat resistance, the use of the reinforcing fillers in the thermoplastic resin composition has a limitation in enhancement of the properties and causes increase in specific gravity with increasing content of the reinforcing fillers.

To address such problems, a method for realizing weight reduction through a physical foaming process using supercritical carbon dioxide, such as the MuCell® process, in injection molding of a thermoplastic resin composition has been developed in the art. However, such a physical foaming process requires a dedicated injection molding machine and can cause uneven foaming of a molded product or deterioration in external appearance thereof.

Therefore, there is a need for development of a thermoplastic resin composition that exhibits good properties in terms of heat resistance, rigidity, lightness, external appearance, and the like without a separate injection molding machine for physical foaming.

The background technique of the present invention is disclosed in Korean Patent Laid-open Publication No. 2007-0046914 and the like.

DISCLOSURE

Technical Problem

It is one object of the present invention to provide a thermoplastic resin composition that exhibits good properties in terms of rigidity, heat resistance, lightness, external appearance, and balance therebetween, and a method for preparing the same.

It is another object of the present invention to provide a molded product formed from the thermoplastic resin composition.

The above and other objects of the present invention can be accomplished by the present invention described below.

Technical Solution

One aspect of the present invention relates to a thermoplastic resin composition. The thermoplastic resin composition includes: 100 parts by weight of a thermoplastic resin including a repeat unit represented by Formula 1, a repeat unit represented by Formula 2 and a repeat unit represented by Formula 3; and about 5 parts by weight to about 40 parts by weight of reinforcing fillers,

[Formula 1]

where $R_1$ and $R_2$ are each independently a hydrogen atom, a methyl group or an ethyl group, and Ar is a substituted or unsubstituted $C_6$ to $C_{20}$ aryl group;

[Formula 2]

[Formula 3]

where $R_3$ is

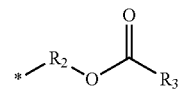

(where $R_4$ is a $C_1$ to $C_5$ alkylene group, $R_5$ is a $C_1$ to $C_{30}$ linear alkyl group, and * indicates a linking site).

In some embodiments, the thermoplastic resin may include about 54 wt % to about 94 wt % of the repeat unit represented by Formula 1, about 5 wt % to about 45 wt % of the repeat unit represented by Formula 2, and about 0.1 wt % to about 8 wt % of the repeat unit represented by Formula 3.

In some embodiments, the thermoplastic resin may be prepared through melting and kneading of an aromatic vinyl copolymer including the repeat unit represented by Formula 1 and the repeat unit represented by Formula 2 and a compound represented by Formula 4 at about 150° C. to about 350° C.,

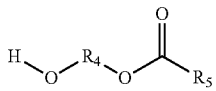

[Formula 4]

where $R_4$ and $R_5$ are the same as defined in Formula 3.

In some embodiments, the reinforcing fillers may include at least one selected from the group consisting of carbon fibers, glass fibers, and mineral fillers.

In some embodiments, the thermoplastic resin composition may further include a rubber-modified vinyl graft copolymer and an aromatic vinyl-vinyl cyanide copolymer.

In some embodiments, the rubber-modified vinyl graft copolymer may be prepared through graft polymerization of an aromatic vinyl monomer and a monomer copolymerizable with the aromatic vinyl monomer to a rubber polymer.

In some embodiments, the aromatic vinyl-vinyl cyanide copolymer may be a copolymer of a monomer mixture including about 20 wt % to about 95 wt % of an aromatic vinyl monomer, about 5 wt % to about 40 wt % of a vinyl cyanide monomer, and about 75 wt % or less of a monomer copolymerizable with the aromatic vinyl monomer.

In some embodiments, the thermoplastic resin composition may include about 5 to about 40 parts by weight of the rubber-modified vinyl graft copolymer and about 5 to about 40 parts by weight of the aromatic vinyl-vinyl cyanide copolymer relative to 100 parts by weight of the thermoplastic resin.

In some embodiments, the thermoplastic resin composition may have a heat deflection temperature of about 105° C. to about 170° C., as measured in accordance with ASTM D648 and a tensile strength of about 70 MPa to about 150 MPa, as measured in accordance with ASTM D638.

Another aspect of the present invention relates to a method of preparing a thermoplastic resin composition. The method may include preparing a thermoplastic resin composition including 100 parts by weight of a thermoplastic resin including a repeat unit represented by Formula 1, a repeat unit represented by Formula 2 and a repeat unit represented by Formula 3; and about 5 parts by weight to about 40 parts by weight of reinforcing fillers by melting and kneading an aromatic vinyl copolymer including the repeat unit represented by Formula 1 and the repeat unit represented by Formula 2, a compound represented by Formula 4, and the reinforcing fillers at about 150° C. to about 350° C.,

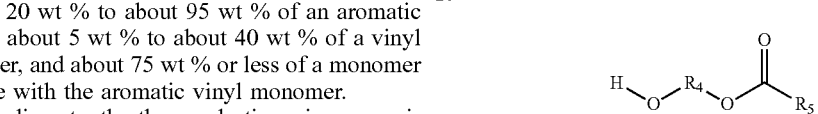

[Formula 1]

where $R_1$ and $R_2$ are each independently a hydrogen atom, a methyl group or an ethyl group, and Ar is a substituted or unsubstituted $C_6$ to $C_{20}$ aryl group;

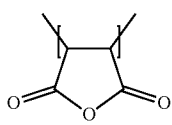

[Formula 2]

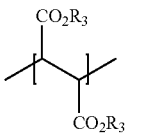

[Formula 3]

where $R_3$ is

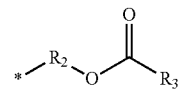

(where $R_4$ is a $C_1$ to $C_5$ alkylene group, $R_5$ is a $C_1$ to $C_{30}$ linear alkyl group, and * indicates a linking site);

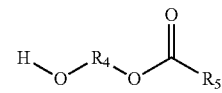

[Formula 4]

where $R_4$ and $R_5$ are the same as defined in Formula 3.

In some embodiments, the method may further include mixing a rubber-modified vinyl graft copolymer and an aromatic vinyl-vinyl cyanide copolymer before melting and kneading.

In some embodiments, the thermoplastic resin composition may further include about 5 to about 40 parts by weight of the rubber-modified vinyl graft copolymer and about 5 to about 40 parts by weight of the aromatic vinyl-vinyl cyanide copolymer relative to 100 parts by weight of the thermoplastic resin.

Another aspect of the present invention relates to a molded product produced from the thermoplastic resin composition.

Advantageous Effects

The present invention provides a thermoplastic resin composition exhibiting good properties in terms of rigidity, heat resistance, lightness, external appearance, and balance therebetween, a method for preparing the same, and a molded product formed therefrom.

DESCRIPTION OF DRAWINGS

FIG. 1 is a picture of a section of a specimen for evaluation of physical properties prepared in Example 1.

FIG. 2 is a picture of a section of a specimen for evaluation of physical properties prepared in Example 1.

BEST MODE

Hereinafter, embodiments of the present invention will be described in detail.

A thermoplastic resin composition according to the present invention includes (A) a thermoplastic resin; and (B) reinforcing fillers.

(A) Thermoplastic Resin

The thermoplastic resin according to embodiments of the invention includes a repeat unit represented by Formula 1, a repeat unit represented by Formula 2 and a repeat unit represented by Formula 3, and is prepared by melting/kneading as in extrusion.

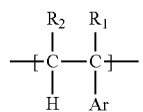
[Formula 1]

In Formula 1, $R_1$ and $R_2$ are each independently a hydrogen atom, a methyl group or an ethyl group, and Ar is a C6 to C20 aryl group substituted or unsubstituted with a substituent such as a halogen atom. Examples of Ar may include a phenyl group, a p-methylphenyl group, a p-t-butylphenyl group, a xylene group, a monochlorophenyl group, a dichlorophenyl group, a dibromophenyl group, a naphthyl group, and an anthracenyl group.

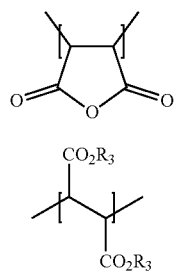
[Formula 2]

[Formula 3]

In Formula 3, $R_3$ is

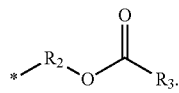

Here, $R_4$ may be a $C_1$ to $C_5$ alkylene group, for example, an alkylene group, an ethylene group, a propylene group or a butylene group, specifically an ethylene group, $R_5$ may be a $C_1$ to $C_{30}$ linear alkyl group, for example, a $C_5$ to $C_{25}$ linear alkyl group, and * is a linking site.

In some embodiments, the thermoplastic resin may include about 54 wt % to about 94 wt %, for example, about 57 wt % to about 91 wt %, of the repeat unit represented by Formula 1, about 5 wt % to about 45 wt %, for example, about 8 wt % to about 42 wt %, of the repeat unit represented by Formula 2, and about 0.1 wt % to about 8 wt %, for example, about 0.5 wt % to about 6 wt %, of the repeat unit represented by Formula 3. Within this range, the thermoplastic resin composition exhibits good properties in terms of rigidity, heat resistance, lightness, external appearance, and balance therebetween.

In some embodiments, the thermoplastic resin may have a weight average molecular weight of about 5,000 g/mol to about 250,000 g/mol, for example, about 10,000 g/mol to about 200,000 g/mol, as measured by gel permeation chromatography (GPC). Within this range, the thermoplastic resin exhibits good properties in terms of heat resistance and fluidity.

In some embodiments, the thermoplastic resin may be prepared by melting/kneading an aromatic vinyl copolymer including the repeat unit represented by Formula 1 and the repeat unit represented by Formula 2 and a compound represented by Formula 4 at about 150° C. to about 350° C. The aromatic vinyl copolymer and the compound represented by Formula 4 react with each other while producing water, whereby the thermoplastic resin composition according to the present invention and a molded product formed therefrom can have a foamed structure through chemical foaming without a separate physical foaming process and thus can exhibit improvement in lightness.

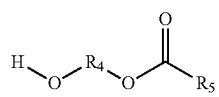
[Formula 4]

where $R_4$ and $R_5$ are the same as defined in Formula 3.

In some embodiments, the aromatic vinyl copolymer is a copolymer of an aromatic vinyl monomer and maleic anhydride. For example, the aromatic vinyl copolymer may be prepared through polymerization of a monomer mixture including the aromatic vinyl monomer and the maleic anhydride, in which polymerization may be carried out by any known polymerization method, such as emulsion polymerization, suspension polymerization, bulk polymerization, and the like, or may be obtained from commercially available products in the art.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof.

In some embodiments, based on 100 wt % of the monomer mixture (mixture of the aromatic vinyl monomer and the maleic anhydride), the aromatic vinyl monomer may be present in an amount of about 55 wt % to about 95 wt %, for example, about 58 wt % to about 92 wt %, and the maleic anhydride may be present in an amount of about 5 wt % to about 45 wt %, for example, about 8 wt % to about 42 wt %. Within this range, the thermoplastic resin can exhibit good heat resistance.

In some embodiments, the aromatic vinyl copolymer may have a weight average molecular weight of about 5,000 g/mol to about 250,000 g/mol, for example, about 10,000 g/mol to about 200,000 g/mol, as measured by gel permeation chromatography (GPC). Within this range, the thermoplastic resin exhibits good properties in terms of heat resistance and fluidity.

In some embodiments, the compound represented by Formula 4 reacts with a maleic anhydride unit (Formula 1) of the aromatic vinyl copolymer to generate water, thereby forming the unit represented by Formula 3.

In some embodiments, the compound represented by Formula 4 may be present in an amount of about 0.1 to about 8 parts by weight, for example, about 0.5 to about 8 parts by weight, relative to about 100 parts by weight of the aromatic vinyl copolymer. Within this range, the thermoplastic resin with the contents of the repeat units represented by Formulae 1, 2 and 3 can be prepared.

(B) Reinforcing Fillers

According to embodiments of the invention, the reinforcing fillers serve to enhance mechanical properties of the thermoplastic resin composition, such as rigidity and the like, and may include at least one selected from the group consisting of carbon fibers, glass fibers, mineral fillers, and a combination thereof. Preferably, carbon fibers are used in order to enhance rigidity and weight reduction of the thermoplastic resin composition. For example, the reinforcing fillers may be mixed with the aromatic vinyl copolymer and the compound represented by Formula 4 and then subjected to melting/kneading, whereby the thermoplastic resin composition contains the reinforcing fillers.

In some embodiments, the carbon fibers may have an average particle diameter of about 5 μm to about 10 μm, for example, about 6 μm to about 9 μm, and an average length of about 2 mm to about 10 mm, for example, about 3 mm to about 9 mm. Within these ranges, the carbon fibers can improve rigidity of the thermoplastic resin composition without deterioration in other properties, such as heat resistance, external appearance, and the like.

In some embodiments, the glass fibers may have an average particle diameter of about 5 μm to about 10 μm and may have various cross-sectional shapes, such as a circular shape, an elliptical shape, a rectangular shape, and the like. The glass fibers may be partially or entirely coated with a coupling agent.

In some embodiments, the mineral fillers may include talc, wollastonite, whisker, mica, basalt fibers, and combinations thereof, without being limited thereto. The mineral fillers may have various shapes, such as a fiber shape, a particle shape, a rod shape, a needle shape, a flake shape, and an amorphous shape, and may have various cross-sectional shapes, such as a circular shape, an elliptical shape, a rectangular shape, and the like. In addition, the mineral fillers may have an average particle size of, for example, about 50 nm to about 100 μm.

In some embodiments, the reinforcing fillers may be present in an amount of about 5 to about 40 parts by weight, for example, about 10 to about 40 parts by weight, relative to about 100 parts by weight of the thermoplastic resin. Within this range, the reinforcing fillers can enhance properties of the thermoplastic resin composition in terms of heat resistance, rigidity, lightness, and balance therebetween.

According to embodiments of the invention, the thermoplastic resin composition may further include (C) a rubber-modified vinyl graft copolymer and (D) an aromatic vinyl-vinyl cyanide copolymer.

(C) Rubber-Modified Vinyl Graft Copolymer

According to embodiments of the invention, the rubber-modified vinyl graft copolymer may be obtained through graft polymerization of an aromatic vinyl monomer and a monomer copolymerizable with the aromatic vinyl monomer to a rubber polymer. For example, the rubber-modified vinyl graft copolymer may be obtained by adding the aromatic vinyl monomer and the monomer copolymerizable with the aromatic vinyl monomer to the rubber polymer, followed by polymerization, and may further include a monomer for imparting processability and heat resistance, as needed. Here, polymerization may be performed by any typical polymerization method known in the art, such as emulsion polymerization, suspension polymerization, and bulk polymerization.

In some embodiments, the rubber polymer may include diene rubbers, such as polybutadiene, poly(styrene-butadiene), and poly(acrylonitrile-butadiene); saturated rubbers obtained by adding hydrogen to the diene rubbers; isoprene rubbers; acrylic rubbers such as poly(butyl acrylate); and ethylene-propylene-diene monomer terpolymer (EPDM). These may be used alone or as a mixture thereof. For example, the rubber polymer may be a diene rubber, specifically a polybutadiene rubber. The rubber polymer may be present in an amount of about 5 wt % to about 65 wt %, for example, about 10 wt % to about 60 wt %, based on 100 wt % of the rubber-modified vinyl graft copolymer. Within this range, the thermoplastic resin composition including the rubber-modified vinyl graft copolymer can have good mechanical properties including impact resistance, heat resistance, fluidity, and the like.

In some embodiments, the rubber polymer (rubber particles) may have an average (Z-average) particle diameter of about 0.05 μm to about 6 μm, for example, about 0.15 μm to about 4 μm. Within this range of average particle diameter, the thermoplastic resin composition including the rubber-modified vinyl graft copolymer can have good mechanical properties including impact resistance, heat resistance, fluidity, and the like.

In some embodiments, the rubber polymer may be formed by polymerizing an aromatic vinyl monomer and a vinyl cyanide monomer swollen into the rubber polymer. For example, the rubber polymer may be prepared by adding a mixture of the aromatic monomer, the vinyl cyanide monomer, and a polymerization initiator to the rubber polymer, followed by stirring the mixture and the rubber polymer in the presence of an emulsifier, a molecular weight regulator and water such that the aromatic monomer and the vinyl cyanide monomer are swollen into the rubber polymer; and polymerizing the aromatic monomer and the vinyl cyanide monomer swollen into the rubber polymer. Such a method of forming the rubber polymer is well known in the art and can be easily performed by those skilled in the art.

In some embodiments, the aromatic vinyl monomer is a monomer copolymerizable with the rubber copolymer, and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 15 wt % to about 94 wt %, for example, about 20 wt % to about 80 wt %, based on 100 wt % of the rubber-modified vinyl graft copolymer. Within this range, the thermoplastic resin composition including the rubber-modified vinyl graft copolymer can have good mechanical properties including impact resistance, heat resistance, fluidity, and the like.

Examples of the monomer copolymerizable with the aromatic vinyl monomer may include acrylonitrile, methacrylonitrile, ethacrylonitrile, phenylacrylonitrile, α-chloroacrylonitrile, and fumaronitrile, without being limited thereto. These may be used alone or as a mixture thereof. Specifically, acrylonitrile, methacrylonitrile, and the like may be used as the monomer copolymerizable with the aromatic vinyl monomer. The monomer copolymerizable with the aromatic vinyl monomer may be present in an amount of about 1 wt % to about 50 wt %, for example, about 5 wt % to about 45 wt %, based on 100 wt % of the rubber-modified vinyl graft copolymer. Within this range, the thermoplastic resin composition including the rubber-modified vinyl graft copolymer can have good mechanical properties including impact resistance, heat resistance, fluidity, and the like.

Examples of the monomer for imparting processability and heat resistance may include acrylic acid, methacrylic acid, alkyl acrylate, alkyl methacrylate, maleic anhydride, a maleimide-based monomer (N-substituted maleimide), and a mixture thereof, without being limited thereto. The monomer for imparting processability and heat resistance may be present in an amount of about 15 wt % or less, for example, about 10 wt % or less, based on 100 wt % of the rubber-modified vinyl graft copolymer. Within this range, the rubber-modified vinyl graft copolymer can improve processability and heat resistance of the thermoplastic resin composition without deterioration in other properties thereof.

In some embodiments, the rubber-modified vinyl graft copolymer may include, for example, an acrylonitrile-butadiene-styrene graft copolymer (g-ABS) in which styrene as the aromatic vinyl monomer and acrylonitrile as the vinyl cyanide monomer are grafted to a core of a polybutadiene rubber polymer.

In some embodiments, the rubber-modified vinyl graft copolymer may be present in an amount of about 5 to about 40 parts by weight, for example, about 10 to about 40 parts by weight, relative to about 100 parts by weight of the thermoplastic resin. Within this range, the rubber-modified vinyl graft copolymer can enhance properties of the thermoplastic resin composition in terms of impact resistance and the like.

(D) Aromatic Vinyl-Vinyl Cyanide Copolymer

According to embodiments of the invention, the aromatic vinyl-vinyl cyanide copolymer may be obtained through polymerization of a monomer mixture including an aromatic vinyl monomer, a vinyl cyanide monomer, and, as needed, a monomer copolymerizable with the aromatic vinyl monomer excluding the vinyl cyanide monomer. Here, polymerization may be performed by any typical polymerization method known in the art, such as emulsion polymerization, suspension polymerization, and bulk polymerization.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 20 wt % to about 95 wt %, for example, about 20 wt % to about 90 wt %, based on 100 wt % of the aromatic vinyl-vinyl cyanide copolymer. Within this range, the thermoplastic resin composition can have good mechanical properties including impact resistance, heat resistance, fluidity, and the like.

Examples of the vinyl cyanide monomer may include acrylonitrile, methacrylonitrile, ethacrylonitrile, phenylacrylonitrile, α-chloroacrylonitrile, and fumaronitrile, without being limited thereto. These may be used alone or as a mixture thereof. Specifically, acrylonitrile, methacrylonitrile, and the like may be used as the vinyl cyanide monomer. The vinyl cyanide monomer may be present in an amount of about 5 wt % to about 40 wt %, for example, about 10 wt % to about 40 wt %, based on 100 wt % of the aromatic vinyl-vinyl cyanide copolymer. Within this range, the thermoplastic resin composition can have good mechanical properties including impact resistance, heat resistance, fluidity, and the like.

Examples of the monomer copolymerizable with the aromatic vinyl monomer excluding the vinyl cyanide monomer may include acrylic acid, methacrylic acid, alkyl acrylate, alkyl methacrylate, maleic anhydride, a maleimide-based monomer (N-substituted maleimide), and a mixture thereof, without being limited thereto. The monomer copolymerizable with the aromatic vinyl monomer excluding the vinyl cyanide monomer may be present in an amount of about 75 wt % or less, for example, about 0.1 wt % to about 70 wt %, based on 100 wt % of the aromatic vinyl-vinyl cyanide copolymer. Within this range, the aromatic vinyl-vinyl cyanide copolymer can have improved processability and heat resistance without deterioration in other properties.

In some embodiments, the aromatic vinyl-vinyl cyanide copolymer may be present in an amount of about 5 to about 40 parts by weight, for example, about 10 to about 40 parts by weight, relative to 100 parts by weight of the thermoplastic resin. Within this range, the thermoplastic resin composition can achieve further improvement in heat resistance, fluidity, and the like.

In some embodiments, the thermoplastic resin composition may further include typical additives, as needed. Examples of the additives may include a flame retardant, an antioxidant, an anti-dripping agent, a lubricant, a release agent, a nucleating agent, an antistatic agent, a UV stabilizer, pigments, dyes, and a mixture thereof. The additives may be present in an amount of about 0.001 to about 20 parts by weight relative to about 100 parts by weight of the thermoplastic resin composition.

The thermoplastic resin composition according to the embodiments of the invention may be prepared in pellet form by mixing the aromatic vinyl copolymer, the compound represented by Formula 4 and the reinforcing fillers, followed by melting/kneading through extrusion under conditions of about 150° C. to about 350° C., for example, about 180° C. to about 300° C. If extrusion is performed at a temperature of less than about 150° C., the thermoplastic resin cannot be efficiently formed from the aromatic vinyl copolymer and the compound represented by Formula 4, and if extrusion is performed at a temperature of greater than about 350° C., there is a disadvantage of deterioration in properties due to decomposition of the resins. Extrusion may be performed by any extrusion process well known in the art.

Before melting/kneading through extrusion, the rubber-modified vinyl graft copolymer, the aromatic vinyl-vinyl cyanide copolymer, and the additives may be further added to the thermoplastic resin composition, as needed.

The thermoplastic resin composition according to the present invention may have a heat deflection temperature of about 105° C. to about 170° C., for example, about 110° C. to about 165° C., as measured in accordance with ASTM D648, and a tensile strength of about 70 MPa to about 150 MPa, for example, about 80 MPa to about 140 MPa, as measured in accordance with ASTM D638.

A molded product according to the present invention is produced from the thermoplastic resin composition. For example, the prepared pellets may be formed into various molded articles (products) by various molding methods, such as injection molding, extrusion molding, vacuum molding, and casting. Such molding methods are well known to those skilled in the art. The thermoplastic resin composition according to the present invention and the molded products produced therefrom exhibit good properties in terms of heat resistance, rigidity, lightness, external appearance, and balance therebetween, and thus can be advantageously used in various fields, such as interior/exterior materials for automobile parts, electric/electronic products, and the like.

FIG. 1 is a picture of a section of a specimen for evaluation of physical properties prepared in Example 1 and FIG. 2 is a picture of a section of a specimen for evaluation of physical properties prepared in Comparative Example 1. Referring to FIG. 1 and FIG. 2, it can be seen that the thermoplastic resin composition according to the present invention enables weight reduction through reduction in specific gravity due to formation of a vacancy in a molded product.

MODE FOR INVENTION

Next, the present invention will be described in more detail with reference to some examples. It should be understood that these examples are provided for illustration only and are not to be in any way construed as limiting the present invention.

Example

Details of components used in Examples and Comparative Examples are as follows.

(A) Thermoplastic Resin

A thermoplastic resin prepared through extrusion of a mixture comprising an aromatic vinyl copolymer (A1) and a compound represented by Formula 4 (A2) was used. The thermoplastic resin contained a styrene unit (a1), a maleic anhydride unit (a2), and a unit (a3) represented by Formula 3 in amounts as listed in Table 1.

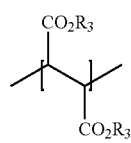

[Formula 3]

In Formula 3, $R_3$ is

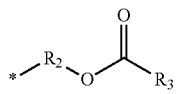

(where $R_4$ is an ethylene group, $R_5$ is a $C_{27}$ linear alkyl group, and * indicates a linking site).

(A1) As the aromatic vinyl copolymer, a styrene-maleic anhydride copolymer (SMA resin, weight average molecular weight: 80,000 g/mol, styrene (Formula 1, a1):maleic anhydride (Formula 2, a2) (weight ratio)=74:26) was used.

(A2) The compound represented by Formula 4 was used.

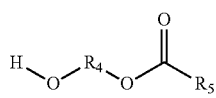

[Formula 4]

In Formula 4, $R_4$ is an ethylene group and $R_5$ is a $C_{27}$ linear alkyl group.

(B) Reinforcing Fillers

Carbon fibers (Manufacturer: Zoltek, Product Name: Panex® 35(type-95)) were used.

(C) Rubber-Modified Vinyl Graft Copolymer

An acrylonitrile-butadiene-styrene graft copolymer (g-ABS) resin prepared by grafting 42 wt % of styrene and acrylonitrile (weight ratio (styrene/acrylonitrile): 73/27) to 58 wt % of polybutadiene rubbers (PBR, average particle diameter (Z-average): 310 nm) was used.

(D) Aromatic Vinyl-Vinyl Cyanide Copolymer

A styrene-acrylonitrile copolymer (SAN) resin having a weight average molecular weight of 100,000 g/mol (weight ratio (styrene/acrylonitrile): 72/28) was used.

Examples 1 to 4 and Comparative Examples 1 to 4

The aromatic vinyl copolymer (A1) comprising the styrene unit (a1) and the maleic anhydride unit (a2), the compound represented by Formula 4 (A2), the reinforcing fillers (B), the rubber-modified vinyl graft copolymer (C), and the aromatic vinyl-vinyl cyanide copolymer (D) were mixed in amounts as listed in Table 1 in a tumbler mixer for 5 minutes. Then, the mixture was added to a twin-screw extruder (L/D=32, Φ: 45 mm) and subjected to melt-extrusion under conditions of an extrusion temperature of 270° C. and a screw speed of 250 rpm, thereby preparing pellets of a thermoplastic resin composition comprising the thermoplastic resin (A) comprising the styrene unit (a1), the maleic anhydride unit (a2) and the unit represented by Formula 3 (a3), the reinforcing fillers (B), the rubber-modified vinyl graft copolymer (C), and the aromatic vinyl-vinyl cyanide copolymer (D). The prepared pellets were dried at 100° C. for 4 hours or more and injection-molded in an injection molding machine (LGH-140N, Manufacturer: LG Cable & System) at a cylinder temperature of 280° C., thereby preparing specimens for property evaluation. The prepared specimens were evaluated as to the following properties by the following methods, and results are shown in Table 1.

Property Evaluation (1) Heat deflection temperature (HDT, unit: ° C.): Heat deflection temperature was measured at a heating rate of 120° C./hr under a load of 1.8 MPa in accordance with ASTM D648.

(2) Tensile strength (TS, unit: MPa): Tensile strength was measured on a 3.2 mm thick specimen in accordance with ASTM D638.

(3) Specific gravity: Specific gravity was measured in accordance with ASTM D792.

(4) Surface appearance: A surface state of a specimen having a size of 100 mm×100 mm×3.2 mm was observed with the naked eye. Generation of a filler protrusion, a vacancy or a depression at a certain portion on the surface of the specimen was rated as × and no generation of a filler protrusion, a vacancy or a depression on the surface of the specimen was rated as ○.

TABLE 1

|  |  | Example | | | | Comparative Example | | | |
|---|---|---|---|---|---|---|---|---|---|
|  |  | 1 | 2 | 3 | 4 | 1 | 2 | 3 | 4 |
| (A) (100 parts by weight) | (A1) (wt %) | 99.3 | 98.4 | 99.4 | 99.5 | 100 | 99.3 | 99.3 | 100 |
|  | (A2) (wt %) | 0.7 | 1.6 | 0.6 | 0.5 | — | 0.7 | 0.7 | — |
| (B) (parts by weight) | | 16.6 | 16.4 | 14.2 | 16.2 | 16.7 | 3.3 | 45.1 | 16.3 |
| (C) (parts by weight) | | 33.1 | 32.8 | 14.2 | — | 33.3 | 39.7 | 18.1 | — |
| (D) (parts by weight) | | 16.6 | 16.4 | 14.2 | — | 16.7 | 23.2 | 18.1 | — |
| HDT (° C.) | | 150 | 149 | 153 | 157 | 151 | 100 | 162 | 157 |
| TS (MPa) | | 92 | 87 | 98 | 110 | 95 | 45 | 104 | 112 |
| Specific gravity | | 1.081 | 1.076 | 1.112 | 1.170 | 1.126 | 1.039 | 1.172 | 1.218 |
| Surface appearance | | ○ | ○ | ○ | ○ | ○ | ○ | x | ○ |

From the results, it could be seen that the thermoplastic resin compositions according to the present invention exhibited good properties in terms of heat resistance, rigidity, lightness, external appearance, and balance therebetween.

On the contrary, the thermoplastic resin compositions of Comparative Examples 1 and 4, which were prepared without using the compound represented by Formula 4 (A2), had higher specific gravity than the thermoplastic resin compositions of Examples 1 and 4, thereby failing to achieve weight reduction; the thermoplastic resin composition of Comparative Example 2 prepared using a small amount of the reinforcing fillers suffered from deterioration in heat resistance and rigidity; and the thermoplastic resin composition of Comparative Example 3 prepared using an excess of the reinforcing fillers suffered from deterioration in external appearance due to protrusion of the fillers.

It should be understood that various modifications, changes, alterations, and equivalent embodiments can be made by those skilled in the art without departing from the spirit and scope of the invention.

The invention claimed is:

1. A thermoplastic resin composition comprising:
100 parts by weight of a thermoplastic resin comprising a repeat unit represented by Formula 1, a repeat unit represented by Formula 2, and a repeat unit represented by Formula 3; and
about 5 parts by weight to about 40 parts by weight of reinforcing fillers,

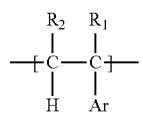
[Formula 1]

wherein $R_1$ and $R_2$ are each independently a hydrogen atom, a methyl group or an ethyl group, and Ar is a substituted or unsubstituted $C_6$ to $C_{20}$ aryl group;

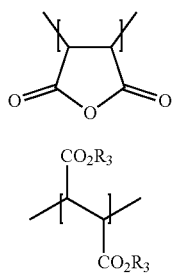
[Formula 2]

[Formula 3]

wherein $R_3$ is

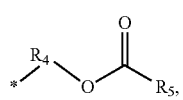

wherein $R_4$ is a $C_1$ to $C_5$ alkylene group, $R_5$ is a $C_1$ to $C_{30}$ linear alkyl group, and * indicates a linking site.

2. The thermoplastic resin composition according to claim 1, wherein the thermoplastic resin comprises about 54 wt % to about 94 wt % of the repeat unit represented by Formula 1, about 5 wt% to about 45 wt % of the repeat unit represented by Formula 2, and about 0.1 wt % to about 8 wt % of the repeat unit represented by Formula 3.

3. The thermoplastic resin composition according to claim 1, wherein the thermoplastic resin is prepared through melting and kneading of an aromatic vinyl copolymer comprising the repeat unit represented by Formula 1 and the repeat unit represented by Formula 2 and a compound represented by Formula 4 at about 150° C. to about 350° C.,

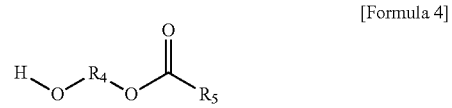
[Formula 4]

where $R_4$ and $R_5$ are the same as defined in Formula 3.

4. The thermoplastic resin composition according to claim 1, wherein the reinforcing fillers comprise carbon fibers, glass fibers, and/or mineral fillers.

5. The thermoplastic resin composition according to claim 1, further comprising: a rubber-modified vinyl graft copolymer and an aromatic vinyl-vinyl cyanide copolymer.

6. The thermoplastic resin composition according to claim 5, wherein the rubber-modified vinyl graft copolymer is prepared through graft polymerization of an aromatic vinyl monomer and a monomer copolymerizable with the aromatic vinyl monomer to a rubber polymer.

7. The thermoplastic resin composition according to claim 5, wherein the aromatic vinyl-vinyl cyanide copolymer is a copolymer of a monomer mixture comprising about 20 wt % to about 95 wt % of an aromatic vinyl monomer, about 5 wt % to about 40 wt % of a vinyl cyanide monomer, and about 75 wt % or less of a monomer copolymerizable with the aromatic vinyl monomer.

8. The thermoplastic resin composition according to claim 5, wherein the thermoplastic resin composition comprises about 5 to about 40 parts by weight of the rubber-modified vinyl graft copolymer and about 5 to about 40 parts by weight of the aromatic vinyl-vinyl cyanide copolymer relative to 100 parts by weight of the thermoplastic resin.

9. The thermoplastic resin composition according to claim 1, wherein a molded product produced from the thermoplastic resin composition has a heat deflection temperature of about 105° C. to about 170° C., as measured in accordance with ASTM D648 and a tensile strength of about 70 MPa to about 150 MPa, as measured in accordance with ASTM D638.

10. A method of preparing a thermoplastic resin composition, comprising:
preparing a thermoplastic resin composition comprising:
100 parts by weight of a thermoplastic resin comprising a repeat unit represented by Formula 1, a repeat unit represented by Formula 2 and a repeat unit represented by Formula 3; and about 5 parts by weight to about 40 parts by weight of reinforcing fillers by melting and kneading an aromatic vinyl copolymer comprising the repeat unit represented by Formula 1 and the repeat unit represented by Formula 2, a compound represented by Formula 4, and the reinforcing fillers at about 150° C. to about 350° C.,

[Formula 1]

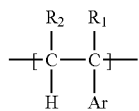

wherein $R_1$ and $R_2$ are each independently a hydrogen atom, a methyl group or an ethyl group, and Ar is a substituted or unsubstituted $C_6$ to $C_{20}$ aryl group;

[Formula 2]

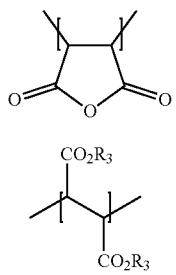

[Formula 3]

wherein $R_3$ is

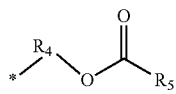

wherein $R_4$ is a $C_1$ to $C_5$ alkylene group, $R_5$ is a $C_1$ to $C_{30}$ linear alkyl group, and * indicates a linking site;

[Formula 4]

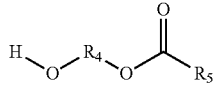

wherein $R_4$ is a $C_1$ to $C_5$ alkylene group and $R_5$ is a $C_1$ to $C_{30}$ linear alkyl group.

11. The method of preparing a thermoplastic resin composition according to claim 10, further comprising: mixing a rubber-modified vinyl graft copolymer and an aromatic vinyl-vinyl cyanide copolymer before melting and kneading.

12. The method of preparing a thermoplastic resin composition according to claim 11, wherein the thermoplastic resin composition further comprises about 5 to about 40 parts by weight of the rubber-modified vinyl graft copolymer and about 5 to about 40 parts by weight of the aromatic vinyl-vinyl cyanide copolymer relative to 100 parts by weight of the thermoplastic resin.

13. A molded product produced from the thermoplastic resin composition according to claim 1.

* * * * *